US006853636B1

(12) United States Patent
Merchant

(10) Patent No.: US 6,853,636 B1
(45) Date of Patent: *Feb. 8, 2005

(54) REVERSE CALL ORIGINATION VIA A PACKET SWITCHED NETWORK

(75) Inventor: Amyn Merchant, Plano, TX (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 427 days.

(21) Appl. No.: 08/560,051

(22) Filed: Nov. 17, 1995

(51) Int. Cl.[7] .......................... H04L 12/66; H04M 3/42
(52) U.S. Cl. ................... 370/352; 379/210.01
(58) Field of Search ................. 379/202, 203, 379/204, 206, 207, 112–115, 90.01, 93.01, 229, 230, 231, 232, 233, 220; 370/389, 465, 466, 467, 392, 352, 485, 435, 404, 458, 401, 522, 524

(56) References Cited

U.S. PATENT DOCUMENTS

| | | | | |
|---|---|---|---|---|
| 5,027,387 A | * | 6/1991 | Moll .................... | 379/115.01 |
| 5,425,084 A | * | 6/1995 | Brinskele ................ | 379/112 |
| 5,602,846 A | * | 2/1997 | Holmquist et al. ......... | 370/384 |
| 5,661,790 A | * | 8/1997 | Hsu ..................... | 379/209 |
| 5,818,836 A | * | 10/1998 | DuVal ................... | 370/389 |
| 5,852,656 A | * | 12/1998 | Sato et al. ............... | 379/93.21 |
| 5,943,399 A | * | 8/1999 | Bannister et al. .......... | 370/493 |
| 6,311,231 B1 | * | 10/2001 | Bateman et al. ........ | 379/265.09 |
| 6,377,576 B1 | * | 4/2002 | Zwick et al. .............. | 370/352 |
| 6,430,282 B1 | * | 8/2002 | Bannister et al. ...... | 379/265.09 |

FOREIGN PATENT DOCUMENTS

WO          WO 92/01350        *  1/1992    ............. 379/207

OTHER PUBLICATIONS vocaltec inc., Internet Phone: Getting Started, 22 pages, May 17, 1995.*

* cited by examiner

Primary Examiner—Steven Nguyen

(57) ABSTRACT

A telephone call is originated in a reverse direction, i.e., from a called party to a calling party, using a packet switched network. According to one embodiment of the invention, a calling party located in a first country may wish to place a call to a party in a second country having cheaper telephone rates. To benefit from the cheaper telephone rates of the second country, the calling party sends a data message—via a packet switched network—to a service provider in the second country requesting reverse call origination. The request message may be sent to an electronic mailbox maintained by the service provider and located on a global computer network, such as the Internet. The service provider of the second country, upon receiving the message, dials the destination number of the called party supplied in the request message. After reaching the called party, the service provider of the second country dials the calling party and bridges the call between the two parties. The calls thus originate from and are billed at the lower telephone rates of the second country. In another embodiment of the present invention, a telephone call may originate from a service provider of a country having lower telephone rates even though the called and calling parties are located at other respective countries.

19 Claims, 2 Drawing Sheets

REVERSE CALL ORIGINATION VIA A PACKET SWITCHED NETWORK

FIELD OF THE INVENTION

This invention relates to telecommunications equipment and services and, in particular, a method of reverse origination of a telephone call placed by a called party to a calling party via a non-signaling network (a computer network, for example) instead of a packet switched signaling network (Signaling System 7 (SS7), for example).

BACKGROUND OF THE INVENTION

According to current prices and tariffs, an inbound U.S. telephone call from another country is more expensive than an outbound U.S. call to that country. This means that a call originated in the U.S. for termination in a foreign country is typically cheaper than the reversed call, i.e., the same call originated in the foreign country for termination in the U.S. This is particularly true in the emerging free market economies which have less advanced and fewer telecommunications networks than the U.S. Absence of competitive market forces, as well as considerable investment of capital required for entering the telecommunications market, contribute to the existing high cost of telecommunications equipment and services in those countries.

The significant difference in telephone rates between the U.S. inbound and outbound telephone calls has spawned a new industry of so-called reverse call origination. The traditional, i.e. forward, origination of a telephone call is from a calling party to a called party. The calling party pays for the call charges with the exception of a collect call, 1-800 call, bill-to-third-party call, certain cellular services, special N00 services where N (2–9) is the first digit for an area code (Numbering Plan Area) of a telephone number, etc. In contrast to the forward call origination, the reverse telephone call originates from the called party equipment at the request of the calling party. The signaling information associated with the call proceeds in the reverse direction: from a switching office (switch), connected to the called party station via a Private Branch Exchange (PBX), to a switch serving the calling party via another PBX, for example. As known in the art, a signaling network, being a part of a telecommunications network, provides for an exchange of information related to a telephone call for voice/data/video. Typically, such signaling messages carry information regarding call set-up or tear-down, card validation, number translation, and other data transactions associated with the telephone call. Utilizing the reverse call origination, the calling party pays the call charges even though the call has been originated by the telecommunications equipment serving the called party station.

As stated above, a significant cost advantage exists in originating an international telephone call from the U.S. To capitalize on cheaper U.S. calling rates and non-trivial price difference, several companies have set up operations in the U.S. for providing reverse call origination services to people abroad who place calls to the U.S. In some cases, the telephone service using the reverse call origination can be used advantageously even for calls that do not terminate in the U.S. These are transitory calls—from one foreign country to another foreign country via the U.S.—that establish the U.S. as a point of origin for obtaining cheaper rates.

Typically, the providers of the reverse call origination service purchase volume discounted telephone service from major U.S. long distance carriers and then resell it to callers in other countries at a higher premium. By providing the reverse call origination to the callers abroad, the resellers may place inbound international calls at slightly higher U.S. rates than the major U.S. long distance carriers. Nevertheless, the cost of the call is still lower than the cost of an inbound international call originated outside the U.S.

One of the most widely used methods of the reverse call origination, also known as a call-back service, is based on automatic number identification (ANI) detecting means. For example, if an overseas caller Pierre wishes to call Jimmy, a business acquaintance in the U.S. Pierre would dial a telephone number of a U.S. based Company ABC which provides the reverse call origination service for international callers. Pierre rings the Company ABC's telephone, for example, several times and then hangs up. Since the call was not completed, Pierre does not incur any charges for it. Based on the transmitted signaling information, the Company ABC determines Pierre's telephone number with the use of the ANI detecting means. The Company ABC, using a "live" or automated operator, then calls Pierre and asks for the called party number, i.e., Jimmy's telephone number. After obtaining the requested number, the Company ABC places the call to Jimmy. If Jimmy answers, then both parties, i.e., Jimmy and Pierre, are held on line, and the operator bridges the call between them. Using this call-back service, Pierre pays the call charges which are based on the U.S. rates even though he initiated the call from outside the U.S.

The described method has two significant drawbacks. First, the calling party outside the U.S. evades payments to the foreign-based telephone carrier for the call expenses because the initiating call was not completed to the providers of the reverse call origination (Company ABC). The call was purposefully intended not to be completed. The foreign telephone carrier does not collect any money for the uncompleted call even though the telephone carrier incurs expenses for transmitting signaling information associated with the call alerting. Cumulative effect of lost revenues by the foreign carriers may negatively affect foreign relations between the U.S. and other countries, and possibly violate international telecommunications treaties to which the U.S. is a signatory country.

Adversely affected by this service, the international carriers could either apply pressure on the Company ABC to discourage the reverse call origination or deploy means to outright prevent it. For example, high volume unanswered calls to the U.S. could be easily detected and consequently blocked by the international carrier on a called or calling number basis.

Setting aside the above issue for a moment, the second disadvantage of the above method includes the need for additional hardware and human resources. Thus, this method requires two outbound U.S. calls (one call leg is from the Company ABC to Jimmy, and the other call leg is from the Company ABC back to Pierre); the U.S. operator's involvement to set up the calls; and special ANI detecting equipment for determining the calling party's number. The required additional features contribute to the service complexity, and the attending higher cost for the reverse call origination service.

A more sophisticated method of the reverse call origination eliminates the need for the "live" operator and two phone calls, as disclosed in U.S. Pat. No. 5,027,387 to Moll. In the '387 patent, a system is described having a special REDIC (Reverse Direction Calling) equipment which serves calling and called stations. When a caller desires to cost effectively place a call to another country or to a different time zone within the U.S., the call is sent to the caller's PBX and then to the REDIC equipment which includes a computer and a database. The computer uses the database to determine whether the call would be cheaper if it were originated by the called party. If so, the calling party's REDIC sends a packetized message via the public network to the called party's REDIC requesting reverse call origination. After the handshaking, screening and confirmation of the request between the two REDICs, the call is originated by the called party rather than the calling party.

The '387 patent has certain advantages over the previously described ANI-based service, and is well suited for situations in which cheaper calling rates vary based on time of the day that the call is placed and the calling zone within the U.S. Thus, taking into account a three hour difference between Los Angeles and New York, in accordance with the Moll's invention, a 7:00 a.m. call (Eastern Standard Time) between LA and NY will be originated from LA to take advantage of the off-peak telephone rates. On the other hand, a 7:00 p.m. call (Eastern Standard Time) will be originated from NY to save on long distance calls. It is apparent that the cost effectiveness of the calling rates alternates due to the time zone difference. Therefore, the additional expense of installing REDIC equipment will not cause the attending significant loss of revenue for different vendors and service providers, because the number of calls originated from either NY or LA will not, on average, increase or decrease disproportionately.

The '387 patent, however, does not suggest any incentive for installing the additional REDIC equipment by a common carrier if the calling rates of that carrier are always higher than the other carrier, as is the case with the U.S. and foreign carriers. If the calls always originate from the U.S., the foreign carrier will most certainly refuse to support the reverse call origination and may even lobby its government to prohibit the service via diplomatic channels.

To overcome the above disadvantages of the prior art, the present invention provides for reverse call origination via a non-signaling network without imposing any unfair burden on the foreign carrier for the call setup, tear down, etc. or requiring any additional specialized telephone equipment.

SUMMARY OF THE INVENTION

The present invention originates a telephone call from a country with low telephone rates to a country with high telephone rates by using a non-signaling network, such as a global computer network, for example, without additional specialized telephone equipment or any modifications to switches and databases in either country, or any manipulation of signaling information transmitted by a carrier in the high tariff country, and provides flexible allocation of charges.

In accordance with one embodiment of the invention, a calling party in a foreign country sends a request message to an electronic mailbox requesting the reverse call origination service. The mailbox is located on a global computer network, such as the Internet for example, and maintained by a U.S. service provider. The message includes an electronically generated form, i.e., a pre-formatted message, which is prepared by the provider. It comprises the calling party number, the called party number, and various optional parameters. As one option, the message may be encrypted to transfer customer's confidential information across the network safely.

After the form is filled out and sent to the mailbox by the customer, a microprocessor executing an application program on the computer network parses the information fields of the form and sends the card number for verification to a database. If the card is valid, the microprocessor executing the application program notifies the U.S. service provider of the request and forwards the information provided by the calling party. If the card is not valid, the request for the reverse call origination is aborted.

The service provider places a call to the called party in the U.S., then to the calling party abroad, and finally connects or bridges the two calls. After the call is completed, the calling party is charged for the calls at the U.S. rates because the two calls were made from the U.S.

In accordance with another embodiment of the invention, the calling party may supply a calling card number belonging to a third party. With the previously obtained authorization, the call charges will be paid by the third party.

In accordance with yet another embodiment of the invention, the call may be billed to the calling party in accordance with a previously agreed upon arrangement.

The advantages of sending information via a non-signaling network are as follows. First, the international carrier does not have to expend its resources on an unbillable call. Second, such pertinent information as a billing number (customer number, credit card number, etc.), a called party number, a calling party number, etc. can be sent in an initial message, thereby avoiding a call-back to the customer for collecting this information. This translates into lower costs for providing the reverse call origination service and possible savings for customers. Third, a separate line is not required for each customer resulting in fewer lines required to be purchased by the customers. Fourth, a destination number can be checked to determine if it is available, i.e., the destination telephone is "off-hook," the network is congested, etc. The call will be reverse originated only if the destination telephone is "on-hook," which again translates into lower costs and possible customer savings.

BRIEF DESCRIPTION OF THE DRAWINGS

The above-mentioned as well as additional advantages and features of the present invention will be evident and more clearly understood when considered in conjunction with the accompanying drawings, in which.

In all Figures, like reference numerals represent same or identical components of the present invention.

DESCRIPTION OF THE PREFERRED EMBODIMENTS

Figure 1:
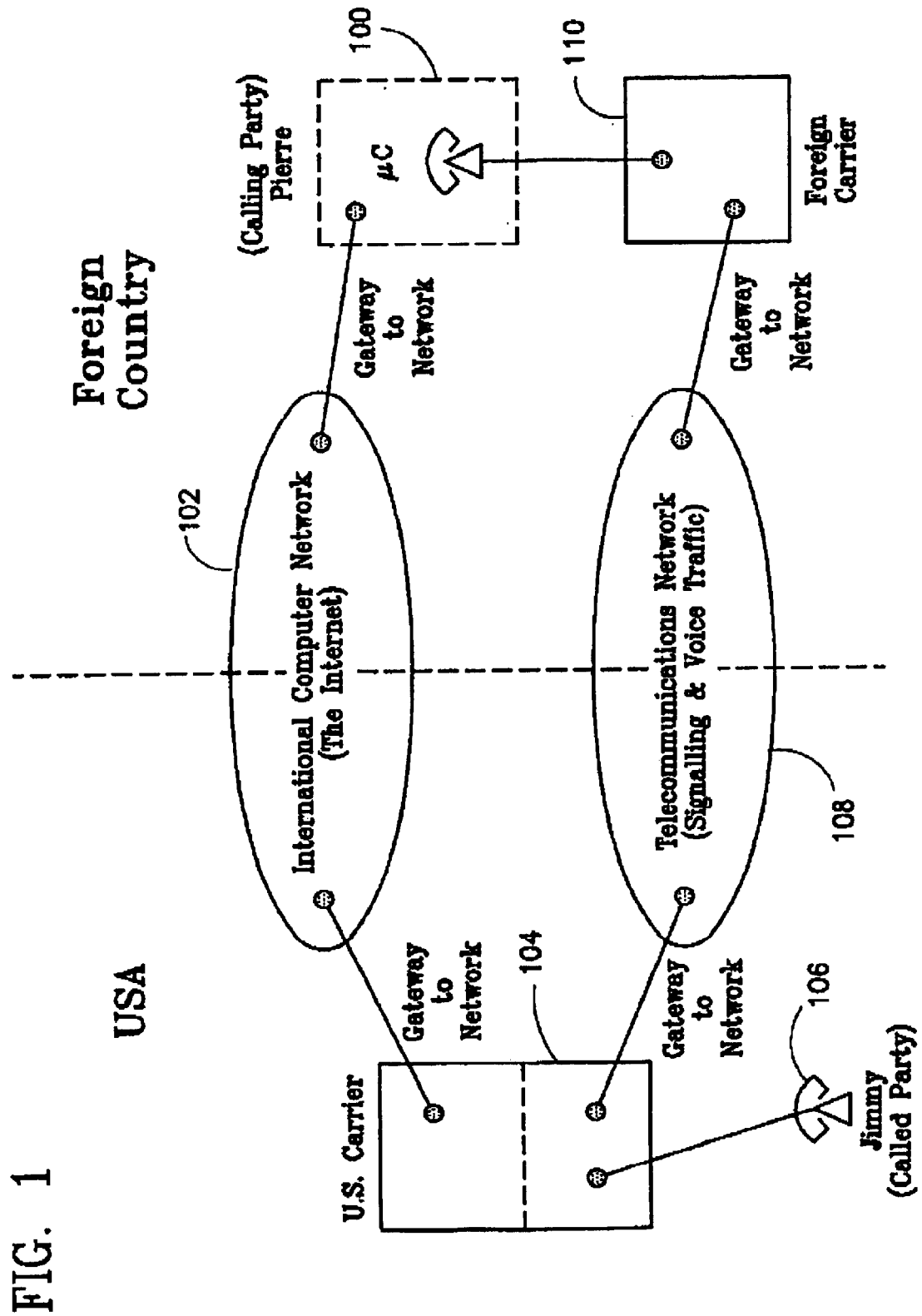
FIG. 1 shows a block diagram of a telephone call from Pierre (a calling party in a foreign country) to Jimmy (a called party in the U.S.) using the reverse call origination via a computer network in accordance with one embodiment of the present invention.

One embodiment of the disclosed invention includes a calling party located in a foreign country who desires to call a party in the U.S. using the reverse call origination. According to this embodiment of the present invention as shown in FIG. 1, the calling party, i.e., Pierre, 100 has access to a non-signaling network, i.e., a global computer network such as the Internet 102, for example. To take advantage of the U.S. telephone rates which are lower than telephone rates in most other countries, the calling party 100 accesses the computer network 102 and sends a request for the reverse call origination to an electronic mailbox on the on-line computer service. The mailbox may be a computer account which the operator of the computer network allocates to the owner of the account upon request and/or fee. The account may be set up with various privileges requested by the owner, such as the size, authorized access, etc. For example, the owner may require the users of the computer network 102 to enter a password or an access code for sending or receiving messages to and from the mailbox.

In accordance with the disclosed invention, a U.S. service provider, i.e., a U.S. long distance carrier 104, maintains the mailbox on the computer network 102, which is specifically allocated for processing reverse call origination requests. To access the mailbox and send a call origination request message, the U.S. provider 104 may require, for example, a password previously obtained by the calling party 100. In the alternative, no password may be needed to request the reverse call origination. In either case, the calling party 100 sends a request message comprising the following information:

calling party's number;

called party's number;

billing information and data, which may include, for example, a credit card or calling card number to be charged for the service, etc.

other optional parameters, such as a password, etc.

In the current example, the calling party's number is the foreign telephone number, and the called party's number is the destination number of the call to the U.S. The calling party 100 enters this information into an electronically pre-formatted message generated by a computer program on the network 102. The message is specifically tailored to the reverse call origination and has fields assigned to this particular function. The calling party 100 fills in the requested information in the pre-formatted message via his computer or computer terminal connected to the computer network 102.

As previously stated, the request message with the above information is directed to the mailbox operated by the U.S. service provider 104. In accordance with FIG. 1, the computer program directs a microprocessor in a computer operated by the U.S. long distance carrier 104 to poll the mailbox for new messages every 3–5 seconds, for example, to obtain a quick turnaround response. Not all electronic mail systems, however, perform the polling function. As known in the art, some e-mail systems do not have to poll a mailbox to receive a message. Instead, these systems are automatically notified as soon as the message arrives at its destination, i.e., the mailbox in the current example. Since data in the message is presented in a standard format as selected and specified by the service provider 104, the microprocessor can easily interpret or "parse" the information fields without any assistance from the "live" operator.

Next, the microprocessor executing the application program verifies the calling party's card number by accessing a database for card authorizations. There is no need for a separate database to validate the credit card, such as Visa, Master Card, American Express, etc., as the same databases currently used by subscribing merchants may be used for the card authorization in the disclosed invention. In a case of a calling card owned by a different U.S. long distance carrier than the one operating the reverse call origination service, an agreement may be reached, for example, providing for the use of the competitor's card. As an alternative embodiment of the present invention, verification may not be performed for corporate or other users who established accounts with the service provider 104.

Regardless of the type of card used by the calling party 100 to pay for the call, if the card is determined to be valid, the application program operated by the U.S. long distance carrier 104 notifies its U.S. telephone operator of the request to place a call. The U.S. telephone operator is also provided with the calling party's and the called party's telephone numbers via a record retrieved from the mailbox. The U.S. operator then places a call to a called party, i.e., Jimmy, 106 located in the U.S. as shown in FIG. 1. If the call is successfully terminated, the U.S. operator then calls the calling party 100 in the foreign country via a telecommunications network 108 and a foreign carrier 110 as known in the art. Upon establishing a voice communication with Pierre 100, the U.S. operator bridges the call between Pierre 100 and Jimmy 106 as also known in the art.

If Jimmy's telephone line is busy or the call cannot be terminated because the network is congested, etc., the attempt to reach the called party 106 may be repeated until the voice connection is established. Alternatively, a message may be returned to the calling party 100 indicating the current status.

The calling party's card is billed for the two call legs, i.e., one call from the U.S. telephone operator to Jimmy and the other from the U.S. telephone operator to Pierre. The duration of the call extends to the point when one of the call legs is terminated. Even though two calls, instead of one, are made by the calling party 100, both calls are billed at the U.S. telephone rate. For several countries with high telephone rates, the combination of two U.S. calls is still cheaper than a forward originated call to the U.S.

As another feature of the present invention, the U.S. carrier 104 may contain a database comprising telephone rates for inbound and outbound calls between the U.S. and various countries. When the U.S. carrier 104 receives a request for reverse call origination, its computer accesses the database to determine whether the two U.S. calls are less expensive than a normally originated, i.e., forward, call to the U.S. If this is the case, then the reverse call origination proceeds as described above. If, however, the computer determines that the forward originated call is cheaper than the two U.S. originated calls, the computer then uses the computer network 102 to send a message to Pierre advising him of this situation. Another alternative may be for Pierre's computer to expect a reply and stop waiting (time out) after 30 seconds, for example: if no response message is received from the service provider's computer, then the reverse call origination will occur as requested by Pierre.

Figure 2:
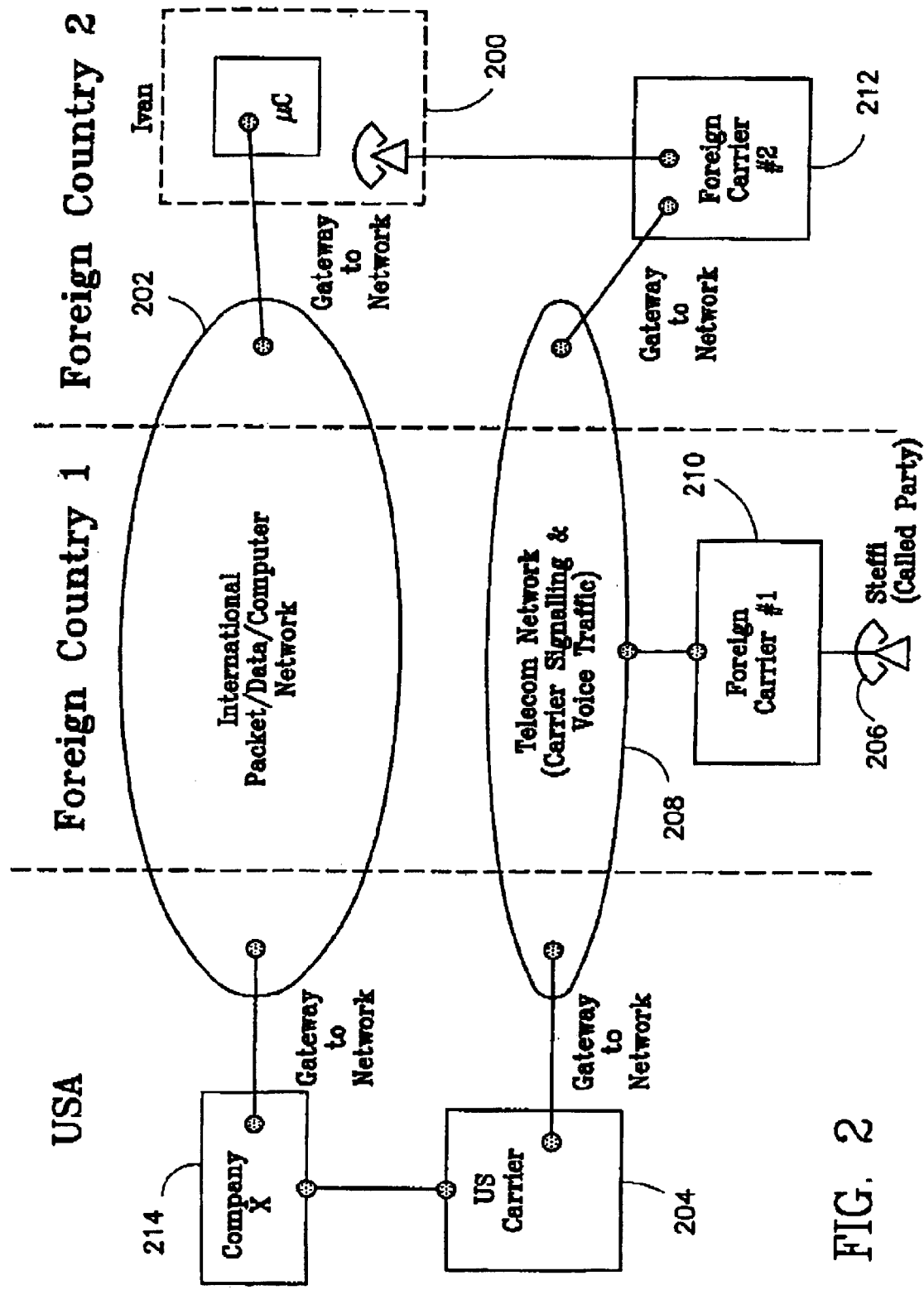
FIG. 2 shows a block diagram of a telephone call from Ivan (a calling party located in the first foreign country) to Steffi (a called party in the second foreign country) via the U.S. using the reverse call origination in accordance with another embodiment of the present invention.

Another embodiment of the present invention is illustrated in FIG. 2 which shows a block diagram of a telephone call transiting, instead of terminating in, the U.S. According to FIG. 2, Ivan 200, i.e., a calling party located in the first foreign country, wishes to call Steffi 206, i.e., a called party located in the second foreign country, and sends a data message from his computer. The data message is sent via an international non-signaling network 202, such as a packet network, data network, computer network, etc. as known in the art.

The data message includes an address name and domain name as used on the Internet for example, and is directed to a Company X 214 which is the owner of this address on the network 202. The Company X 214 is a provider of the reverse call origination in accordance with the present invention. The Ivan's message includes:

a calling party number, i.e., his number and extension if applicable;

a called party number, i.e., Steffi's number, including a country code and a national number with an extension if applicable;

billing information which indicates how to bill for this call (Ivan's calling card, third party card, Steffi's calling card, Ivan's or Steffi's credit card, etc.) and billing data (a card number, expiration date, etc.);

password which may be optional; and other optional parameters which may include various instructions to the Company X 214, such as keep calling until Steffi is reached, or retry the call in 5 minutes, etc.

All of the information must be encrypted if the network 202 is exposed to breaches by computer "hackers" or unauthorized users.

After reaching the Company X 214, the Ivan's message is analyzed for accuracy and validation of the billing information and the billing data. The calling number and the password, if applicable, are compared with the entries in a database maintained by the Company X 214. If the calling number, i.e., Ivan's, is requested not to be billed, a credit card or calling card number is checked for validity.

At the completion of validation and/or verification, the Company X 214 calls Steffi 206. As well known in the art, the call proceeds via a U.S. long distance carrier 204, a telecommunications network 208 carrying signaling and voice information, and a foreign carrier 210 serving Steffi's telephone. When Steffi 206 answers the call from the Company X 214, another call is then placed to Ivan 200 via a foreign carrier 212. The two calls are bridged or connected with each other, similar to a 3-party call. If Steffi 206 cannot be reached, i.e., a busy signal or no-answer is received, then the Company X 214 notifies Ivan 200 of this situation. Alternatively, the Company X 214 may not notify Ivan 200 based on the prior arrangement. In this case, Ivan 200, after waiting for several minutes for example, will realize that Steffi cannot be reached.

The above embodiment may also use a database comprising telephone rates for inbound and outbound calls between the U.S. and various countries, as mentioned above in connection with another embodiment of the present invention. By accessing the database, a computer calculates whether the two U.S. calls are less expensive than a normally originated, i.e., forward, call. Based on the outcome of this calculation, the appropriate action is taken as described above.

In another embodiment of the present invention, after completing the validation and/or verification of billing information, the Company X 214 calls Ivan 200 via the U.S. long distance carrier 204, the telecommunications network 208, and the foreign carrier 212 serving the Ivan's telephone. While keeping Ivan 200 on hold, the Company X 214 calls Steffi 206 as described above. Although more expensive for customers, this method is easier to implement in the telephone industry. When Steffi 206 answers the call, the two calls are bridged or connected which is similar to a 3-party call. If Steffi 206 cannot be reached, the Company X 214 may take various courses of action as described above.

Upon completion of their conversation, either Steffi 206 or Ivan 200 hangs up first, and both legs of the call are disconnected at the first indication of a party being disconnected from the call. Billing information is then generated for sending to a party responsible for call charges.

Next, several alternative embodiments will be described with respect to the disclosed invention. First, a service provider of the reverse call origination may want to confirm that a calling party wants to proceed with the call before the original attempt is made to reach a called party. In this scenario, after receiving the request message, the service provider may call the calling party for confirmation of the reverse call origination. After confirming the request, the service provider places the calling party on hold, calls the called party and bridges the two calls.

Confirmation request entails the economic risk on the part of the calling party that the called party is unavailable, and the call cannot be terminated as intended. In this case, the calling party must still pay for the confirmation call made by the service provider. Thus, even though the call could not be terminated to the called party, the calling party incurred the cost for the unsuccessful attempt.

Although filling out the electronic form may delay the voice connection between the calling and called parties, the form may be partially completed by the calling party prior to initiating the request. Such information as the calling party's number and the card number may be included in the form for faster processing. This partially completed form, i.e., a template, may then be stored as a record in a database and quickly retrieved prior to the reverse call origination request. To initiate the service request, the calling party would have to supply only the destination number and quickly transmit the fully completed form to the service provider.

Another alternative of the disclosed invention may use a corporate account. For U.S. companies and businessmen working and staying abroad, a corporate account may be established for billing services in connection with the reverse call origination. As previously stated, in this case no credit card or user verification would have to be performed resulting in a faster voice connection between the callers.

Yet another embodiment of the invention pertains to a third party billing. A party located in a foreign country wants to call a party in the U.S. and charge the call to a third party. The calling party accesses an electronic mailbox maintained by a U.S. long distance carrier on a computer network, for example. Similar to the previously described embodiment, the calling party fills out a form to request the reverse call origination service. The form includes the calling party's number, the called party's number, a third party's card number to be charged for the service and other optional parameters as stated above.

In a case of a credit card, such as Visa, Master Card, American Express, etc., standard information will be required which includes the card number and the expiration date. If a third party's calling card is used, then some uniquely identifying information will be required to verify the authenticity of the third party or the relationship between the calling party and the third party. For example, a U.S. college student studying abroad and having an easy access to the Internet via a college computer may use the parents' calling card and provide the mother's maiden name as the uniquely identifying information.

Validity of the card and authenticity of the calling party proceeds as described in the previous embodiments. Thus, the credit card verification is performed via an existing database used by many merchants in the U.S. and abroad. The calling card information is verified via a remote database typically maintained by many U.S. long distance carriers. In the alternative embodiment which will compromise the security of service for the ease of operation, no additional information may be requested by the long distance carrier except the calling card number.

There are two major advantages of the disclosed invention over the systems and methods described in the prior art. First, the disclosed invention does not require the installation of any additional or specialized equipment at the calling and/or called party's site. No need exists for any modifications of the switches or databases operated by the long distance carriers to provide an interface with the additional equipment for reverse call origination. Many telecommunications databases currently contain foreign telephone rates which are used for comparison according to one aspect of the present invention.

Furthermore, the disclosed invention cannot possibly violate any international agreements and does not place unfair burden on the foreign carriers for transmitting signaling information despite the absence of the actual call completion. The foreign carrier does not incur any expenses during the call origination for setting up and tearing down the call, as described in the prior art, because the call origination request does not use the ANI equipment and completely bypasses international telecommunications networks. It is clear that services of the foreign carrier are not unfairly manipulated by the disclosed invention in contrast to the prior art.

Since those skilled in the art can modify the disclosed specific embodiment without departing from the spirit of the invention, it is, therefore, intended that the claims be interpreted to cover such modifications and equivalents.

What is claimed is:

1. A method of requesting a reverse origination telephone call by a calling party to a called party via an internet protocol network, comprising the steps of:

sending from said calling party to a carrier via said internet protocol network an email message for a reverse origination telephone call which includes telephone numbers of said called and calling parties;

said carrier receiving via said internet protocol network said email message;

extracting said telephone numbers from said email message;

requesting a telephone call via a signaling network to said called party based on said called party telephone number, wherein said signaling network is connected to a circuit switched telephone network;

if a voice response is received from said called party, requesting via said signaling network another telephone call to said calling party based on said calling party telephone number; and if a voice response is received from said calling party, connecting said called and calling parties to effect voice communication therebetween via said circuit switched telephone network.

2. Method according to claim 1, further comprising the step of:

sending via said non-signaling network billing information to said carrier to bill charges incurred for said telephone calls.

3. Method according to claim 2, further comprising the steps of:

maintaining a database for storing at least the billing information of the party to whom said charges are to be billed; and accessing said database and comparing the billing information received via said non-signaling network with said stored billing information of said to be billed party.

4. A method of requesting a reverse origination telephone call from a called party to a calling party via a non-signaling, packet switched network, comprising the steps of:

sending from said calling party to a carrier via said non-signaling, packet switched network an email message for a reverse origination telephone call which includes telephone numbers of said called and calling parties;

said carrier receiving via said non-signaling, packet switched network said email message;

extracting said telephone numbers from said email message;

requesting a telephone call via a signaling network in a public switched telephone network to said called parry based on said called party telephone number;

if a voice response is received from said called party, putting said called party on hold;

requesting another telephone call via said signaling network to said calling party based on said calling party telephone number; and if a voice response is received from said calling party, connecting said called and calling parties to effect voice telecommunication therebetween via said public switched telephone network.

5. Method according to claim 4, further comprising the step of:

sending via said non-signaling network billing information to said carrier to bill charges incurred for said telephone calls.

6. Method according to claim 5, further comprising the steps of:

maintaining a database for storing at least the billing information of the party to whom said charges are to be billed; and accessing said database and comparing the billing information received via said non-signaling network with said stored billing information of said to be billed party.

7. A system for originating a circuit switched network telephone call from a called party to a calling party via a non-proprietary internet protocol, comprising:

a service provider having a computer means connected to a non-signaling, internet protocol network for receiving from said calling party an email message for a reverse origination telephone call from said called party via said non-signaling, internet protocol network and extracting therefrom telephone numbers of a calling party and a called party, said service provider placing a request for a telephone call via a dedicated signaling network to said called party, and another request for a telephone call via said dedicated signaling network to said calling party if a response is received from said called party, said requests for telephone calls being respectively based on said called and calling telephone numbers, said service provider further connecting said called and calling parties to effect voice communication therebetween via a circuit switched network if a response is received from said calling party.

8. The system according to claim 7, wherein said email message further comprises billing information for allocating charges for said first and second telephone calls.

9. The system according to claim 8, further comprising:

a database maintained by said service provider for storing at least the billing information of the party to whom said charges are to be allocated to enable said computer means to-compare billing information received via said computer network with said stored billing information of said to be billed party.

10. The system according to claim 9, wherein said database has stored therein the difference of telephone rates between countries, said database being accessed by said computer means to determine whether the combined costs of said telephone calls are less expensive than the cost of a direct telephone call originated from said calling party.

11. A method of originating a circuit switched network call from a called to a calling party comprising the steps of:

receiving from said calling party an email message for a reverse origination telephone call which includes telephone numbers of both the called and calling parties, via a non-signaling, packet switched network, from the calling party to a service provider;

requesting a call with said called party, from the site of said service provider, over a dedicated signaling network;

requesting said call with said calling party, from the site of said service provider, over a dedicated signaling network; and interconnecting said called and calling parties to effect communication therebetween via a circuit switched network connected to said dedicated signaling network.

12. A method for supporting a reverse call origination service, the method comprising:

extracting a telephone number of a called party and a telephone number of a calling party from an email message sent by the calling party;

initiating a first call leg with the called party based on the called party telephone number;

initiating a second call leg with the calling party based on the calling party telephone number; and selectively bridging the call legs to establish a call between the calling party and the called party.

13. A method according to claim 12, further comprising:

periodically polling an electronic mail box to access the email message.

14. A method according to claim 12, wherein the bridging step is performed by an operator.

15. A method according to claim 12, wherein the email message in the extracting step includes billing information associated with the calling party, the method further comprising:

billing the calling party for the call legs.

16. A method according to claim 12, wherein the email message in the extracting step includes a password, the method further comprising:

verifying the password prior to initiating the first call leg with the called party.

17. A method according to claim 12, further comprising:

requesting confirmation of the reverse call origination service from the calling party over the first call leg.

18. A method according to claim 12, wherein the calling party is located within a foreign region and the called party is in a domestic region, the call legs in the initiating steps originating from the domestic region.

19. A method according to claim 12, further comprising:

determining whether charges for the two call legs are more expensive than charges associated with a call originated by the calling party to called party; and notifying the calling party based on the determination that the charges for the two call legs are more expensive.

\* \* \* \* \*